United States Patent [19]

Coleman et al.

[11] Patent Number: 5,209,692
[45] Date of Patent: May 11, 1993

[54] COMBINATION, A NOVELTY TOY AND A CANDY HOLDING DEVICE

[76] Inventors: Thomas J. Coleman, 89 Winding Way Rd., Bristol, Va. 24201; William K. Schlotter, IV, 175 Toluca Rd., Stafford, Va. 22554

[21] Appl. No.: 818,127

[22] Filed: Jan. 8, 1992

[51] Int. Cl.$^5$ .................. A63H 33/00; A63H 1/00; A63H 1/06; A47B 91/00
[52] U.S. Cl. .................. 446/71; 446/144; 446/236; 446/266; 248/349; 40/411; 426/134
[58] Field of Search ................ 446/71, 76, 81, 5, 144, 446/145, 234, 236, 265, 266, 386, 475, 483, 484, 491; 248/349; 40/411; 426/104, 134

[56] References Cited

U.S. PATENT DOCUMENTS

| | | | |
|---|---|---|---|
| 625,179 | 5/1899 | Lyons et al. | 446/266 X |
| 2,135,606 | 11/1938 | Stuve | 446/236 X |
| 2,627,698 | 2/1953 | Wood | 446/145 |
| 2,731,767 | 1/1956 | Holt | 248/349 X |
| 2,766,123 | 10/1956 | Moubayed | 426/134 X |
| 2,799,587 | 7/1957 | Schwartz | 446/236 X |
| 2,874,496 | 2/1959 | Rakes | 40/411 X |
| 3,054,217 | 9/1962 | D'Amato | 446/236 |
| 3,064,389 | 11/1962 | Lemelson | 446/420 |
| 3,615,596 | 10/1971 | Petti | 426/134 X |
| 3,797,163 | 3/1974 | McRoskey et al. | 446/145 |
| 5,045,014 | 9/1991 | Harkins | 446/236 |

FOREIGN PATENT DOCUMENTS

| | | | |
|---|---|---|---|
| 0036227 | 9/1981 | European Pat. Off. | 426/134 |
| 771896 | 9/1941 | Fed. Rep. of Germany | 426/134 |
| 2323121 | 6/1974 | Fed. Rep. of Germany | 446/145 |
| 0610746 | 5/1979 | Switzerland | 426/134 |
| 832046 | 4/1960 | United Kingdom | 446/145 |

OTHER PUBLICATIONS

"Play Drill", Kenner, Playthings, vol. 62 #7, Jul. 1964.
"Nancy", Washington Post, Apr. 1960.

Primary Examiner—Robert A. Hafer
Assistant Examiner—D. Neal Muir

[57] ABSTRACT

This invention relates to novelties and in particular to a battery-operated candy holding device. This device has a self-contained power supply that operates a motor and gearing system that produces the proper speed and torque, to spin a piece of candy. After the candy has been consumed, this device may be used as a hand held motorized toy. A noisemaker may be added to provide additional enjoyment by the consumer. The batteries are contained in the handle and are replaceable. The replaceable candy is designed to fit securely over the spindle shaft inside an aperture at the top of the candy holding device.

8 Claims, 2 Drawing Sheets

COMBINATION, A NOVELTY TOY AND A CANDY HOLDING DEVICE

This invention is directed to a novelty toy and in particular to a battery-operated candy holding device that spins a piece of candy or any other item.

It is known in U.S. Pat. No. 3,290,157 that a piece of candy has been rotated during consumption by use of a hand held device. Such a device requires the use of both hands and is complicated for a small tot or other child to operate.

Small electric motors have been used heretofore for operating dancing figures as known from U.S. Pat. No. 3,100,365; for a gyroscopic toy as shown from U.S. Pat. No. 2,173,031; and for spinning a hoop toy as known from U.S. Pat. No. 4,100,697.

This invention sets forth a small motor to which a piece of candy is attached for rotation of the candy during consumption.

It is therefore an object of this invention to make use of a battery-operated candy holding device to spin a piece of candy that can be consumed while spinning, or the device can be used as a novelty toy when candy is not attached.

Another object is to provide a motor driven gearing system which will support a piece of candy during rotation while being consumed and after consumption the candy may be replaced and/or the device may be used as a toy without the candy attached.

Yet another object is to make a relatively inexpensive novelty candy holding device in which the candy and/or the battery source may be replaced.

These and other objects will become clearer when related to the description of the drawings.

DETAILED DESCRIPTION

Figure 1:
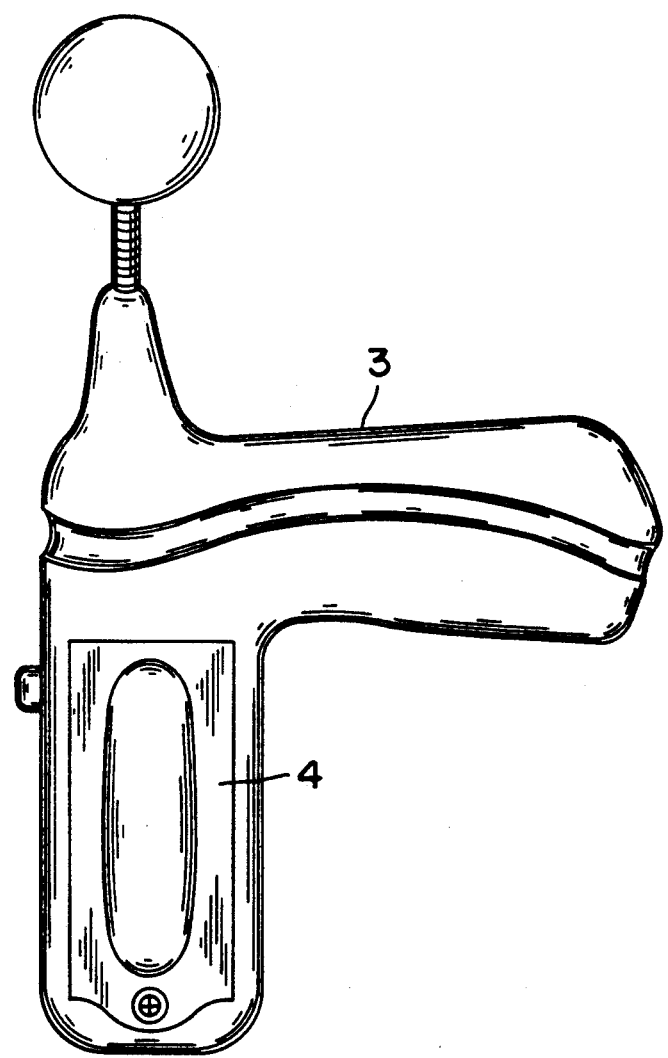
FIG. 1 is a full side view of a novelty candy holding device with a piece of candy attached.
Figure 2:
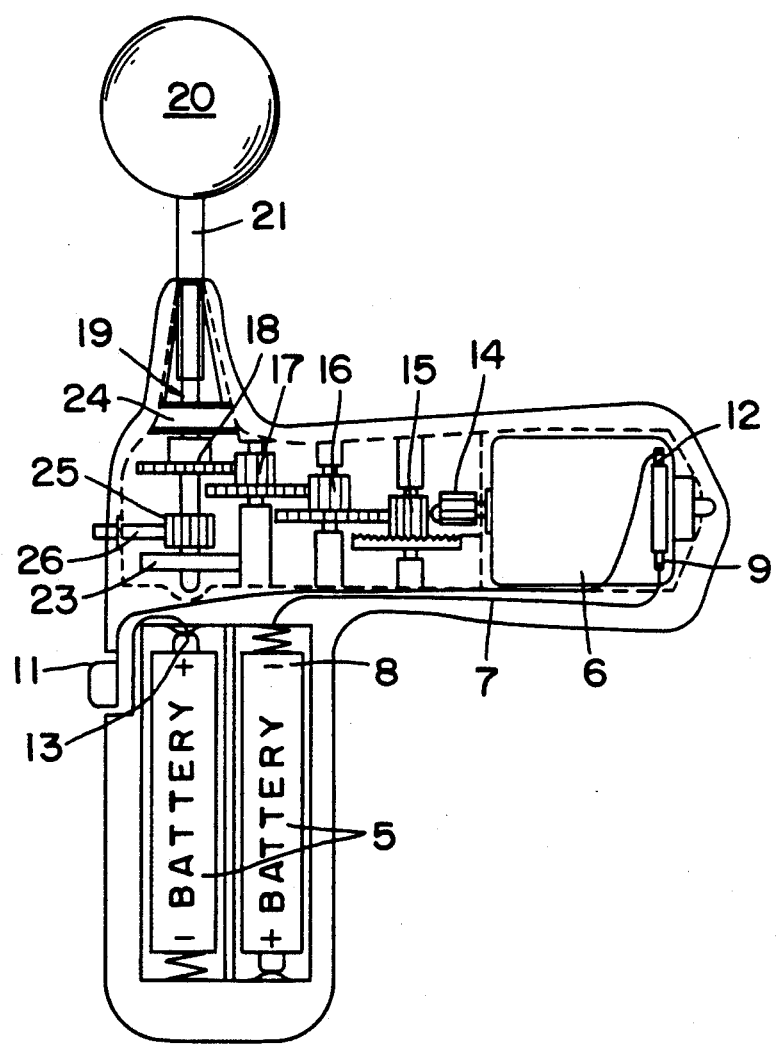
FIG. 2 is a partial cross-section view of a novelty small motor operated candy holding device shown with a piece of candy attached.

Now referring to FIGS. 1 and 2 there is shown a relatively inexpensive motorized candy holding device made in accordance with the invention. As shown, the motorized candy holding device includes a housing (3) with a removeable panel (4) for battery replacement. An electrical energy source (5), which may be one battery or more than one battery, supplies a current to a motor (6) via an electrical circuit including an electrical conductor (7) extending from the negative end of the battery (8) to a negative contact on the motor (9). A contact switch (11) is placed in the electrical circuit between the positive motor contact (12) and the positive side of the battery (13). The motor drive shaft gear (14) engages one or more gears (15,16,17,18) that produces a proper torque to rotate a spindle shaft (19), which in turn rotates the attached piece of candy (20) at the proper speed. The candy is attached to the spindle shaft inside an aperture at the top of the candy holding device via a hollow stick (21).

The shaft (19) is supported in suitable bearings (23) and (24) within the housing (3). The hollow stick on which the candy is found is shown secured to the shaft within the housing. It would be obvious to one skilled in the art that the shaft (19) could extend from the housing (3) with the stick (21) secured to the shaft on the outside of the housing. In this construction the end of the housing could function as a bearing surface. It would also be obvious to one skilled in the art that the end of shaft (19) could be hollow and the end of the candy stick (21) could be inserted into the hollow end of the shaft. Further, a coupling could be secured to the end of the shaft (19) with the candy stick secured to the coupling.

The shaft (19) between the bearing (23) and the gears (17) and (18) could be made with gear teeth (25) and a thin plate (26) could be secured to the housing and extend toward and in contact with the gear teeth so that a noise will be generated as the shaft (19) rotates. Thus, after the candy has been consumed the device could be used as a noisemaker. The thin plate (26) could be made adjustable so that it could be moved away from the gear so that it does make a noise during consumption of the candy.

The holding device and candy may be of any shape or size; however, it is desired that the candy be spherical in shape such as a well known sucker. The candy may be covered by a protective wrapper in order to protect the candy prior to use.

The holding device housing may be made of any durable material which may be formed or molded into any desired shape. Since the novelty device is to be used by children, the device should have no sharp features. It should be of a so called non-breakage material and non toxic. The device is shown with two small batteries. Any number of batteries and any desired size battery may be used which is compatible with the motor. The switch should be a contact type switch (11). If a switch of this type is used, a user such as a small child, will not leave the switch on thus preventing battery drainage or some form of damage due to rotation of the candy while not being consumed.

The gear system between the motor drive shaft gear (14) and the spindle shaft (19) can be configured or designed to cover all forms of motion for rotation of the attached candy. (i.e. spin, rotate, vibrate, agitate, etc.)

What is claimed is:

1. A novelty candy holding device in combination with a piece of candy supported on a stick which comprises;
   a housing,
   an electrical source in said housing,
   an electric motor in said housing,
   an electrical circuitry including said electrical source for operating said electric motor,
   a switch means in said electrical circuitry for controlling current to said electric motor,
   a spindle shaft including first and second ends, each of which are confined and supported within said housing,
   a gearing system in said housing in operative conjunction with said electric motor which rotates said spindle shaft,
   said second end of said spindle shaft engaging one end of said stick upon which the piece of candy is supported.

2. A novelty candy holding device as set forth in claim 1, wherein;
   said housing has a small aperture on a portion of said housing, through which said switch means protrude,
   said electrical source is at least one battery secured in said housing, and a panel in said housing for access to a battery compartment.

3. A novelty candy holding device in combination with a piece of candy as set forth in claim 1, wherein;
    said electric motor positively engages said gearing system for rotating said spindle shaft.

4. A novelty candy holding device as set forth in claim 3, wherein;
    said gearing system steps down a rotational speed of said electric motor to build torque for driving said spindle shaft.

5. A novelty candy holding device in combination with a piece of candy supported on a hollow stick which comprises;
    a housing,
    an electrical source in said housing,
    an electric motor in said housing,
    an electrical circuitry including said electrical source for operating said electric motor,
    a switch means in said electrical circuitry for controlling current to said electric motor,
    a spindle shaft including first and second ends contained and supported within said housing,
    a gearing system in said housing which is positively engaged by said electric motor which steps down a rotational speed of said electric motor to build torque for driving said first end of said spindle shaft,
    said second end of said spindle shaft is of an appropriate size engaging one end of said hollow stick which fits securely onto said spindle shaft inside an aperture of said housing for rotating said hollow stick.

6. A novelty candy holding device as set forth in claim 5, wherein;
    said stick upon which said piece of candy is attached is hollow and slides over said second end of said spindle shaft and said piece of candy is spherical such as a well known sucker.

7. A novelty candy holding device as set forth in claim 6, wherein;
    said spherical candy is set in a rotational motion by said candy holding device.

8. A novelty candy holding device as set forth in claim 1, wherein; said shaft (19) includes gear teeth (25) thereon and a thin plate (26) extends toward and in contact with said gear teeth (25) for making a noise as the shaft (19) rotates.

* * * * *